United States Patent Office 3,792,001
Patented Feb. 12, 1974

3,792,001
CATALYSIS OF URETHANE FOAMS WITH A MIXTURE OF AN ANTIMONY TRIHALIDE AND EITHER AN ANTIMONY ALCOHOLATE OR AN ANTIMONY CARBOXYLATE
John K. Allen, Batavia, and John A. Cengel, Wheaton, Ill., assignors to Standard Oil Company, Chicago, Ill.
No Drawing. Filed Aug. 21, 1972, Ser. No. 282,461
Int. Cl. C08g 22/40, 22/44
U.S. Cl. 260—2.5 AB                  20 Claims

ABSTRACT OF THE DISCLOSURE

The catalysis of urethane foams is improved by the use of a mixture of an antimony trihalide and either an antimony alcoholate or an antimony carboxylate. This catalyst mixture is particularly useful in the preparation of rigid urethane-type foams prepared from polyarylpolyisocyanates and free carboxy-containing adduct polyols. The catalyst mixture is also effective in rigid urethane-type foams containing aromatic carboxylic acid derivatives as a third principal component.

BACKGROUND OF THE INVENTION

This invention relates to a synergistic catalyst for urethane foams, in particular certain rigid urethane-type foams.

Urethane foams and rigid urethane-type foams have many well-known industrial and commercial applications. They have been used as packaging materials, flotation materials, structural furniture components, and structural reinforcement in aircraft parts. A primary use of urethane-type rigid foams is as an insulating material. As an insulator, rigid foams may be shaped into slabs or sheets of varying thicknesses and placed between walls, in roofs, in floors, and the like. The rigid foams may also be used to make metal-foam composites which are prepared by foaming the urethane-type material so that it is brought in contact with or is confined by metal sheet or metal foil. This type of prefabricated composite may be used as a structural member for walls, floors, and roofs. These rigid foams may also be formed into annular or contour shapes which are useful in insulating pipes and ducts. The rigid foams can also be directly applied to numerous substrates by spray foaming techniques. These spray foam applications are particularly important in such areas as warehouses, schools, and offices to provide the necessary insulation requirements proper for heating and cooling.

Most conventional urethane foams are 2-component foams. They are produced by reacting a polyisocyanate with a polyfunctional alcohol or polyol such as a polyether or polyester polyol.

These conventional urethane foams can be catalyzed by many types of compounds. Among the known urethane catalysts are tertiary amines such as triethylamine and the like and organo-tin compounds such as dibutyltin diacetate and the like. U.S. Pat. 3,061,557 teaches the use of antimony trichlorides as catalysts for conventional urethane foams. U.S. Pat. 3,245,957 teaches the use of antimony alcoholates as catalysts for conventional urethane foams. U.S. Pat. 3,245,958 teaches antimony carboxylates as conventional urethane foam catalysts. All of these patents relating to antimony catalysts for conventional urethane foams have one thing in common, the absence of teachings directed toward the combination of antimony catalysts.

What we have discovered is that a synergistic effect occurs when an antimony trihalide and either an antimony alcoholate or an antimony carboxylate is used to catalyze conventional urethane foam reactions. That is, the times required for the foam to rise (rise time) and to become non-sticky or tack free (tack free time) are substantially shorter when the catalyst of this invention is used than when either an antimony trihalide, an antimony alcoholate, or an antimony carboxylate is used alone. This surprising synergistic catalytic activity is most likely due to the existence of a different catalytic reaction mechanism for the antimony trihalides as compared with the antimony alcoholates or carboxylates.

In many of the insulating material applications for rigid urethane-type foams, conventional urethane foams do not possess the required degree of flame resistance, self-extinguishing characteristics, and low smoke production when exposed to flames. Certain modified urethane foam compositions have been developed which tend to overcome a number of the shortcomings of the conventional urethane foams. These modified polyurethane foams, which are disclosed in U.S. Pat. 3,637,543, contain a third principal component, an aromatic carboxylic acid derivative such as trimellitic anhydride or the acid chloride of trimellitic anhydride.

In the production of these modified urethane-type foams, synergistic catalytic activity is observed when an antimony trihalide is used as a catalyst in combination with either an antimony alcoholate or a carboxylate. In addition, with these modified urethane-type foams, conventional urethane catalysts do not produce a rapid enough reaction to permit the foams to be used in applications which require rapid foaming, for instance, the production of metal-foam composites, pipe insulation, and spray foaming of walls and ceilings. As Example 2 indicates, the use of the combination of an antimony trihalide and either an antimony carboxylate or an alcoholate results in rise and tack free times superior to those obtainable with conventional urethane-type catalysts.

Both the conventional 2-component urethane foams and the above-mentioned 3-component modified urethane foams have more recently been improved by the replacement of the normal polyfunctional alcohol or polyol component by adduct polyols containing free carboxyl groups. These carboxy-containing polyols are the half-ester reaction products of (a) polyether polyols and mixtures thereof with (b) anhydrides of polyfunctional carboxylic acids such as tetrabromophthalic anhydride and trimellitic anhydride. These carboxy-containing adduct polyols contain both unreacted hydroxyl groups and carboxyl groups. These polyols are described in U.S. Pat. 3,642,646. Three-component modified urethane foams containing these polyols are described in British Pat. 1,246,732. Rigid urethane-type foams incorporating these free carboxy-containing adduct polyols possess very good flame resistance, good self-extinguishing characteristics, and produce little smoke when exposed to flame.

However, foams prepared from these carboxy-containing adduct polyols are not catalyzed as rapidly or as easily as foams containing conventional polyols. Conventional urethane catalysts do not provide short enough rise and tack free times to permit the carboxy-containing polyol foams to be used in many applications where its use would be most desired. Thus, this important development in the foam art has been excluded from use in many areas due to the unavailability of suitable catalysts.

In a copending application Ser. No. 282,598, filed Aug. 21, 1972 by John K. Allen, antimony trihalides, in particular antimony trichloride, are shown to be extremely effective catalysts for the production of foams containing carboxy-containing half-ester adduct polyols. This development was unexpected as antimony trihalides had been found to be less effective in conventional urethane-type foams than either amine or organo-tin type catalysts. These antimony trihalides catalyze the reaction of foams prepared from carboxy-containing half-ester adduct polyols to such an extent that the foams are useful in many applications where they could not be used before.

In foams prepared from carboxy-containing half-ester adduct polyols and in particular those containing an aromatic carboxylic acid derivative as a third principal component, the use of an antimony trihalide in combination with either an antimony carboxylate or an antimony alcoholate produces synergistic catalytic activity. That is, the rise and tack free times are shorter than those produced by an equal amount of either of the catalyst components used alone. This is particularly advantageous as these foams are no longer limited in use due to the lack of suitable catalysts. Another advantage is found for uses where other catalysts were sufficient in that the amount of catalyst needed to react the components can be reduced. This is helpful both from the standpoint of cost reduction and from the standpoint of foam properties. The latter is due to the fact that the foam properties will less likely be adversely affected by the use of a small amount of catalyst than they would be by a larger amount.

SUMMARY OF THE INVENTION

This invention relates to an improvement in the process for producing urethane foams from organic polyisocyanates and polyols. The improvement in this process is the catalysis of the foaming reaction with a mixture of an antimony trihalide and either an antimony alcoholate or an antimony carboxylate. The use of this particular catalyst combination produces synergistic catalytic activity.

A preferred aspect of this invention is the rapid catalysis with the above-described catalyst components of foams containing an aromatic carboxylic acid derivative as a third principal foam component. Another preferred espect of this invention is the rapid catalysis of foams prepared from carboxy-containing half-ester adduct polyols.

A particularly preferred aspect of this invention is the catalysis of foams prepared from (1) polyarylpolyisocyanates, (2) polyfunctional aromatic carboxylic acid derivatives, and (3) carboxy-containing half-ester adduct polyols by a combination of an antimony trihalide and either an antimony carboxylate or an antimony alcoholate.

DESCRIPTION OF THE INVENTION

The process of this invention involves the use of an antimony trihalide in combination with either an antimony alcoholate or an antimony carboxylate as a catalyst for urethane-type foams. The percentage of antimony trihalide in the catalyst of this process can vary from as little as 10% to as much as 90%. Preferably, the percentage of antimony trihalide in the catalyst is from 15 to 80%; more preferably, from 20 to 60%. The amount of catalyst useful in the process of this invention is from about 0.25 to about 2.5 weight percent of starting materials. Preferably, the amount of catalyst is kept below about 1.5%. Concentrations higher than these may tend to adversely affect foam properties and, of course, increase the cost of the product foam.

The antimony trihalides that are useful in the process of this invention include antimony trifluoride, antimony trichloride, and antimony tribromide. Antimony trichloride has been found to be a particularly effective component of the improved catalyst system described herein.

Illustrative of the antimony carboxylates that are useful in the process of this invention are the following: antimony tallate, antimony tributyrate, antimony tricaproate, antimony triacetate, antimony tris-2-ethylhexanoate, antimony tricaprate, and the like.

The antimony alcoholates that can be used in the process of this invention include antimony tributoxide, antimony tripropoxide, antimony tripentoxide, antimony triethoxide, and the like.

While any polyisocyanate may be useful in this invention, the polyarylpolyisocyanates are preferred. The polyarylpolyisocyanates useful in this invention are liquids containing at least two aromatic rings, each ring being substituted by at least one isocyanato group. The aromatic rings may be suitably interconnected by one or more methylene, propylene, carbonyl, sulfoxide, sulfone or ether linkages. Isocyanate-substituted biphenyls are also suitable. The aromatic rings of any of the above compounds may be additionally substituted by ethyl, methyl, or propyl groups. Specific examples of suitable liquid polyarylpolyisocyanates for use with the invention include: polymethylene polyphenylisocyanates having from 2 to 10 benzene rings and liquid mixtures at room temperature of polymethylene polyphenylisocyanate with one or more of the following polyarylpolyisocyanates: 4,4'-diphenylmethylene diisocyanate; diphenylmethylene 3,3'-diisocyanate; diphenyl diisocyanate; diphenylsulfone diisocyanate; diphenylsulfide diisocyanate; diphenylsulfoxide diisocyanate; and diphenylpropane diisocyanate. Polymethylene polyphenylisocyanates having an average functionality of about 2.1 to 3.5 are particularly suitable isocyanates.

Polyols useful in the process of this invention are the polyols known for the production of urethane foams. Among these are the known polyether polyols such as the polyoxyalkylene glycols wherein the alkylene group has from 2 to about 4 carbon atoms, e.g. poly(oxyethylene) glycol, poly(oxypropylene)glycol, polytetrahydrofuran, poly(oxyethyleneoxypropylene)glycol, and the like; the known vicinal epoxide adducts of organic starters such as the hydroxyl compounds and amines, e.g. glycerine, alphamethyl glucoside, sucrose, pentaerythritol, trimethylolpropane, 1,2,6-hexanetriol, ethylene diamine, ethanolamine, sorbitol, 1,2,4-butanetriol, diethylenetriamine, diethanolamine, and the like. Also useful are the polyesters of polybasic acid with a polyhydroxylic compound. Illustrative of suitable polyester polyols are the reaction products of succinic acid, tetrahydrophthalic acid, fumaric acid, and the like, with ethylene glycol, propylene glycol, diethylene glycol, triethylene glycol, sorbitol, butylene glycol, pentaerythritol, and the like.

The carboxy-containing adduct polyols which are particularly useful in the process of this invention may generally be described as half-ester reaction products of (a) polyether polyols and mixtures thereof with (b) anhydrides of polyfunctional carboxylic acids. Poly(ethylene glycols) may be reacted with the above components or may be added after the carboxy-containing polyols have been prepared. These polyols are described in U.S. Pat. 3,642,646.

The polyether polyols used in the preparation of the carboxy-containing half-ester reaction products or adducts include polyethers such as polyoxyalkylene glycols. These polyethers are obtained by the addition of one or more alkylene oxides, such as ethylene oxide, propylene oxide, and the like, to hydroxy-containing compounds such as ethylene glycol, propylene glycol, diethylene glycol, dipropylene glycol, and the like; or aliphatic polyols such as pentaerythritol, sucrose, sorbitol, alphamethyl glucoside, trimethylolpropane, and the like. Particularly suitable polyether polyols include the poly(oxypropylene) adducts of pentaerythritol, sucrose, sorbitol, alphamethyl glucoside, trimethylolpropane and the like.

These polyether polyols may conveniently be blended prior to reaction in order to maintain a workable viscosity, with poly(ethylene glycols) such as diethylene glycol, triethylene glycol, tetraethylene glycol, or a poly(ethylene glycol) having an average molecular weight in the range of from about 200 to about 500. A particularly preferred glycol is a poly(ethylene glycol) having an average molecular weight of about 200. When polyol/glycol blends are employed, it is advantageous that the blend comprise from about 90 to about 10 weight percent of the glycol and from about 10 to about 90 weight percent of the polyether polyol. In general, a blend of from about 80 to about 20 weight percent of the glycol and from about 20 to about 80 weight percent of the polyether polyol is satisfactory. A particularly preferred composition of the blend is from about 60 to about 25 weight percent of the glycol and from about 40 to about 75 weight percent of the polyether polyol.

The above-mentioned poly(ethylene glycols) may also be added to the prior reacted carboxy-containing polyols.

The anhydrides of polyfunctional carboxylic acids which are suitable for use in preparing the carboxy-containing polyols may be generally described an anhydrides of carboxylic acids containing two or more carboxy functions. The carboxylic acids may be either aromatic or aliphatic and amy contain substituents such as alkyl or halogen in addition to the carboxy functions. Suitable anhydrides include: phthalic anhydride, tetrachlorophthalic anhydride, tetrabromophthalic anhydride, trimellitic anhydride, maleic anhydride, malonic anhydride, succinic anhydride, chlorendic anhydride (Diels-Alder reaction product of hexachlorocyclopentadiene and maleic anhydride), bisanhydride of trimellitic anhydride, pyromellitic dianhydride, and benzophenone tetracarboxylic dianhydride. Tetrabromophthalic anhydride, chlorendic anhydride, and trimellitic anhydride are esepcially preferred.

To form the carboxy-containing half-ester adduct polyols useful in this invention, the polyether polyol, mixture of polyether polyols, or the polyether polyol/poly(ethylene glycol) blend should be combined with from about 5 to about 50 weight percent, on a total weight basis, of the anhydride of the polyfunctional carboxylic acid. A particularly preferred ratio of components is from 25 to 40 weight percent of the anhydride and from 75 to 60 weight percent of the polyether polyol or polyether polyol/poly(ethylene glycol) mixture.

The carboxy-containing half-ester adduct is prepared by heating the mixture of polyol and anhydride at a temperature from about 150 to 350° F., preferably 180 to 220° F., for from 1 to 16 hours, preferably in the presence of a basic catalyst such as triethylamine. The reaction mixture is heated until the acid number corresponds to that of half-ester reaction product. Depending upon the particular constituents, this acid number may be obtained somewhere in the range of 150 to 300° F. Usually, however, it is observed around 180 to 220° F. After the reaction is complete, the adduct composition is allowed to cool and is suitable for immediate use in foam preparation. It is important that the temperature of the reaction remains below the temperature at which the free carboxyl group, which forms when the hydroxy-containing compounds add across the anhydride linkage, will react with the additional hydroxy groups to form a full ester.

Another method by which the polyol adduct composition may be prepared involves combining the anhydride of the polyol or polyol blend in a vessel, together with a catalyst if desired, and heating the mixture directly to between about 200 and 350° F. This temperature is maintained for about one hour. The resulting adduct is allowed to cool and is then ready for use.

As indicated previously, urethane foams within the scope of this invention may include an aromatic carboxylic acid derivative as a third principal component. The presence of this third component tends to reduce the smoke produced on exposure to flame and helps to improve the flame resistance of the foam. The aromatic carboxylic acid derivatives contemplated for use here are polyfunctional derivatives, having the aromatic nucleus substituted by members selected from the group consisting of carboxyl, anhydride or acyl halide. More than one member of this group may be present on the aromatic nucleus. Other substituents may also be present on the aromatic nucleus; for example, alkyl groups containing 1 to 4 carbon atoms, nitro groups and halide groups. Illustrative aromatic carboxylic acid derivatives are trimellitic acid anhydride, trimellitic acid, double anhydride of trimellitic anhydride, trimellitic acid halide, pyromellitic dianhydride, pyromellitic acid, terephthalic acid, phthalic acid, phthalic anhydride, isophthalic acid, trimesic acid, and benzophenone tetracarboxylic acid or the dianhydride or acyl halide derivatives thereof. A particularly preferred derivative is trimellitic acid anhydride.

In addition to the above-described principal or major components, the foams intended to be used with the catalyst of this invention can contain other ingredients. Among the ingredients usually added is a blowing agent. The amount of blowing agent combined with the reactant mixture can vary from about 1 to about 25 weight percent. An advantageous amount of blowing agent is about 10 to 20 weight percent of the foam component mixture.

It is often advantageous to employ additives which produce certain effects in the foam composition. One such additive is a silicone surfactant which is used as a surface tension depressant. Silicone surfactants useful in the foams of this invention may be generally described as siloxane glycol block copolymers with specific gravity in the range 0.5 to 1.5 and viscosity at 25° C. in the range 1 to 1000 cps. The amount of surfactants present can vary from about 0.01 to about 2.0 weight percent of the foam component mixture. An advantageous amount is from about 0.5 to about 1.0 weight percent.

Although they may have serious drawbacks in certain formulations, flame retardants are another type of additive sometimes useful in rigid foams which are used for insulation purposes. The principal types of flame retardants are non-reactive solids and liquids. Many of these compounds are known in the art. Antimony trioxide and halogenated organophosphorus compounds are examples of these inert flame retardants. An advantageous amount of these fire retardant additives is from about 3 to about 6 weight percent of the foam reactant mixture.

Of course, other additives known in the art can be added to the foams disclosed herein without departing from the scope of the invention.

Many known methods of foam production can be used to combine the various ingredients used in the foam. One method is to combine all the ingredients simultaneously. This is usually not practical as the number of components to be combined can be quite large. Preferably all of the minor ingredients and the catalyst and most of or all of the blowing agent are premixed with one of the principal components, either the polyisocyanate or the polyol, before the principal components are combined. Generally it is preferred to combine the catalyst and the other ingredients with the polyol component, although the catalyst and most of the other ingredients can be combined with the polyarylpolyisocyanate. Alternatively, the antimony trihalide can be initially dissolved in a small amount of the glycol component that is generally used to prepare the carboxy-containing adduct polyol. This glycol antimony trihalide mixture can then be blended with the other ingredients generally added to the polyol component.

In the 3-component foam system, the aromatic carboxylic acid derivative can be rapidly mixed with either the polyarylpolyisocyanate or polyol with the resulting mixture then being mixed with the remaining component. In another version all three principal components can be added instantaneously. A preferred method is to prepare a polyarylpolyisocyanate polyfunctional aromatic acid derivative foam precursor mix and react this with the polyol. The catalyst, blowing agent, and other ingredients are added to these components as described above.

The formulation of the foam components is generally within the knowledge of those skilled in the art. However, some formulations are described below.

When a 2-principal component foam system is used, the formulation usually employs from about 0.5 to about 12 equivalents of polyisocyanate for each hydroxy equivalent of the polyol. Advantageously, the polyisocyanate will be employed in an amount equal to from 0.8 to about 1.5 equivalents for each hydroxy equivalent of polyol.

In a suitable formulation of a 3-component foam containing an adduct polyol, the ratio of equivalents of the liquid polyacrylpolyisocyanate to the polyfunctional aromatic carboxylic acid derivative is from 0.6:1.0 to 4.0:1.0 and the ratio of equivalents of the adduct polyol, based on hydroxyl, to the polyarylpolyisocyanate and aromatic carboxylic acid derivative is from 0.1:1.0 to 3.0:1.0. In these calculations, the anhydride group is assigned a functionality of 1 (one). All ratios are calculated using the initial functionality of the starting materials. In a more preferred formulation, the ratio of equivalents of the polyisocyanate to the aromatic carboxylic acid derivative is from 1.1:1.0 to 2.2:1.0 and the ratio of equivalents of the polyol hydroxyl to the polyisocyanate and the aromatic carboxylic acid derivatives is 0.15:1.0 to 0.9:1.0.

The effectiveness of any particular catalyst is usually determined by measuring the time required for the mixed foam components to rise (rise time) and the time required for the foam to become non-sticky (tack free time). In laboratory work, where relative rise and tack free times are important, absolute rise and tack free times are not always measured. In the experiments below, the rise time is determined by measuring the time (in seconds) required for the foam to rise to the top of a 12 inch high paper tub. This generally corresponds to about three-fourths of the total foam rise. The tack free time is taken to be the time (sec.) required for the foam to become non-sticky when contacted with a wooden tongue depressor.

The measurement of these times begins at the end of the mixing period. Typically, foam components need to be mixed for from 15 to 30 seconds in order to develop good foam properties. However, in studies of the relative effectiveness of various catalysts, this mixing time was sometimes reduced to as little as 5 seconds in order to permit some meaningful time differences to be obtained.

Rise and tack free times of a few hundred seconds are generally permissible in the production of bun stock foam as fast catalysis is not usually necessary. Shorter rise and tack free times are required for the production of metal foam composite panels and pipe insulation, and even shorter times are necessary in some applications such as spray foam.

In the examples below: Isocyanate A is a polyarylpolyisocyanate with an average equivalent weight of 133 and an average functionality of 3.1–3.2. Polyol B is a propylene oxide adduct of pentaerythritol with an average equivalent weight of 100 and an average functionality of 4. Polyol C is a carboxy-containing adduct polyol prepared by reacting tetrabromophthalic anhydride, a polyethylene glycol, and a propylene oxide adduct of pentaerythritol with an average equivalent weight of 100 and an average functionality of 4. The weight ratio of these reactants was 2:1:2. Polyol D is a propylene oxide adduct of sucrose with an average equivalent weight of 106 and an average functionality of 8. Polyethylene glycol E–200 was a polyethylene glycol with an average equivalent weight of 100 and a functionality of 2.

Example I

In this example, antimony trichloride (SbCl₃) and antimony tallate (AT) were tested for their effectiveness in a conventional 2-component urethane foam both separately and together. The results in Table I indicate that the combination of these catalysts produced catalytic activity which was particularly strong when about 33% of the catalyst was SbCl₃.

The foam formulation used was:

| | Weight (g.) |
|---|---|
| Isocyanate A | 146 |
| Polyol B | 98 |
| Polyethylene glycol E–200 | 2 |
| Silicone surfactant | 2 |
| Blowing agent R–11 (CFCl₃) | 30 |
| Catalyst, as below | |

The polyol, polyethylene glycol, surfactant, blowing agent, and catalyst were blended together at room temperature. The isocyanate was added all at once with the mixture being stirred with a high speed blade blender for 10 seconds.

TABLE I

| Grams | | Seconds | |
|---|---|---|---|
| SbCl | AT | Total weight | Rise time | Tack free time |
| 2.0 | | 2.0 | 229 | 284 |
| | 2.0 | 2.0 | 117 | 165 |
| 0.5 | 1.5 | 2.0 | 83 | 118 |
| 1.0 | 1.0 | 2.0 | 107 | 138 |
| 1.5 | 0.5 | 2.0 | 146 | 182 |

Example II

In this example, the same catalysts used in Example I were tested in a 3-component modified urethane foam containing a conventional polyether polyol. The results indicate that strong synergistic catalytic activity was obtained at all catalyst ratios tested.

The foam formulation was:

| | Weight (g.) |
|---|---|
| Isocyanate A | 100 |
| Trimellitic anhydride | 55 |
| Polyol B | 50 |
| E–200 | 2 |
| Silicone surfactant | 2 |
| R–11 | 40 |
| Catalyst, as below | |

A mixture of the isocyanate, trimellitic anhydride, and a portion of the blowing agent was added to a mixture of the other ingredients and stirred for 10 seconds.

In comparison, the same foam formulation under similar conditions had a rise time of 250 seconds and a tack free time of 470 seconds when no catalyst was used. When 2.0 g. of triethylamine was used as a catalyst, the rise time was 209 seconds and the tack free time was 370 seconds. When 2.0 g. of dibutyltin diacetate was used as a catalyst, the rise time was 138 seconds and the tack free time was 365 seconds.

TABLE II

| Grams | | Seconds | |
|---|---|---|---|
| SbCl₃ | AT | Total weight | Rise time | Tack free time |
| 2.0 | | 2.0 | 71 | 113 |
| | 2.0 | 2.0 | 98 | 190 |
| 0.5 | 1.5 | 2.0 | 45 | 87 |
| 1.0 | 1.0 | 2.0 | 45 | 89 |
| 1.5 | 0.5 | 2.0 | 55 | 97 |

Example III

In this example, the same catalysts as used in Examples I and II were tested in a 3-component modified urethane foam prepared with a carboxy-containing adduct polyol. The mixing time was 5 sec. The data in Table III shows that for a given weight of catalyst the combination of the antimony trichloride and the antimony tallate is superior to either catalyst used alone.

The foam formulation used in the experiments of this example was:

| | Weight (g.) |
|---|---|
| Isocyanate A | 100 |
| Trimellitic anhydride | 55 |
| Polyol C | 68 |
| E–200 | 13 |
| Polyol D | 20 |
| Silicone surfactant | 2 |
| Liquid halogenated organo-phosphorus flame retardant | 15 |
| R–11 | 40 |
| Catalyst, as below | |

TABLE III

| SbCl₃ | AT | Total weight | Rise time | Tack free time |
|---|---|---|---|---|
| 2.0 | | 2.0 | 31 | 60 |
| | 2.0 | 2.0 | 40 | 106 |
| 1.0 | 1.0 | 2.0 | 24 | 60 |
| 3.0 | | 3.0 | 27 | 45 |
| | 3.0 | 3.0 | 30 | 88 |
| 1.0 | 2.0 | 3.0 | 14 | 38 |
| 2.0 | 1.0 | 3.0 | 15 | 44 |
| 4.0 | | 4.0 | 23 | 37 |
| | 4.0 | 4.0 | 23 | 70 |
| 1.0 | 3.0 | 4.0 | 10 | 28 |
| 2.0 | 2.0 | 4.0 | 8 | 21 |
| 3.0 | 1.0 | 4.0 | 13 | 25 |

Example IV

In this example, antimony trichloride and antimony triacetate were tested for their effectiveness in a 3-component modified urethane foam prepared with a carboxy-containing adduct polyol. The foam formulation used was the same as that used in Example III. The mixing time was 5 seconds.

TABLE IV

| SbCl₃ | Antimony triacetate | Total weight | Rise time | Tack free time |
|---|---|---|---|---|
| 1.0 | | 1.0 | 42 | 90 |
| | 1.0 | 1.0 | 31 | 108 |
| 0.5 | 0.5 | 1.0 | 19 | 66 |
| 2.0 | | 2.0 | 31 | 66 |
| | 2.0 | 2.0 | 18 | 70 |
| 0.5 | 1.5 | 2.0 | 11 | 45 |
| 1.0 | 1.0 | 2.0 | 9 | 30 |
| 1.5 | 0.5 | 2.0 | 11 | 40 |

Example V

In this example, antimony trichloride and antimony tris 2-ethylhexanoate (ATEH) were used as catalysts for a 3-component modified urethane foam prepared with a carboxy-containing adduct polyol. The foam formulation used was that of Example III. The mixing time was 5 seconds.

TABLE V

| SbCl₃ | ATEH | Total weight | Rise time | Tack free time |
|---|---|---|---|---|
| 2.0 | | 2.0 | 35 | 68 |
| | 2.0 | 2.0 | 26 | 95 |
| 1.0 | 1.0 | 2.0 | 14 | 48 |
| 3.0 | | 3.0 | 30 | 53 |
| 2.0 | | 3.0 | 30 | 53 |
| | 3.0 | 3.0 | 21 | 74 |
| 1.0 | 2.0 | 3.0 | 8 | 37 |
| 2.0 | 1.0 | 3.0 | 10 | 32 |

Example VI

In this example, antimony trichloride was tested in combination with antimony tris n-butoxide in the foam formulation described in Example III. The mixing time was 5 seconds.

TABLE VI

| SbCl₃ | Antimony tris n-butoxide | Total weight | Rise time | Tack free time |
|---|---|---|---|---|
| 1.0 | | 1.0 | 42 | 107 |
| | 1.0 | 1.0 | 33 | 110 |
| 0.5 | 0.5 | 1.0 | 18 | 62 |
| 2.0 | | 2.0 | 32 | 66 |
| | 2.0 | 2.0 | 18 | 75 |
| 0.5 | 1.5 | 2.0 | 13 | 48 |
| 1.0 | 1.0 | 2.0 | 10 | 32 |
| 1.5 | 0.5 | 2.0 | 13 | 33 |

Example VII

In this example, antimony trifluoride and antimony tallate were tested for their catalytic effectiveness in the foam formulation described in Example III. The mixing time was 5 seconds.

TABLE VII

| SbF₃ | AT | Total weight | Rise time | Tack free time |
|---|---|---|---|---|
| 2.0 | | 2.0 | 41 | 98 |
| | 2.0 | 2.0 | 41 | 147 |
| 1.0 | 1.0 | 2.0 | 29 | 86 |
| 3.0 | | 3.0 | 36 | 87 |
| | 3.0 | 3.0 | 32 | 111 |
| 1.0 | 2.0 | 3.0 | 19 | 60 |
| 2.0 | 1.0 | 3.0 | 24 | 60 |
| 4.0 | | 4.0 | 28 | 72 |
| | 4.0 | 4.0 | 27 | 100 |
| 1.0 | 3.0 | 4.0 | 13 | 45 |
| 2.0 | 2.0 | 4.0 | 15 | 42 |
| 3.0 | 1.0 | 4.0 | 22 | 55 |

Example VIII

In this example, antimony tribromide was tested in combination with antimony tris 2-ethylhexanoate for catalytic effectiveness in the 3-component foam described in Example III. The mixing time was 5 seconds.

TABLE VIII

| SbBr₃ | ATEH | Total weight | Rise time | Tack free time |
|---|---|---|---|---|
| 2.0 | | 2.0 | 38 | 81 |
| | 2.0 | 2.0 | 30 | 113 |
| 1.0 | 1.0 | 2.0 | 17 | 70 |
| 4.0 | | 4.0 | 24 | 58 |
| | 4.0 | 4.0 | 18 | 100 |
| 1.0 | 3.0 | 4.0 | 14 | 54 |
| 2.0 | 2.0 | 4.0 | 9 | 47 |
| 3.0 | 1.0 | 4.0 | 12 | 42 |

What we claim is:

1. In a process for producing urethane foams by the reaction of an organic polyisocyanate and a polyol, the improvement comprising the carrying out of the foaming reaction in the presence of a catalytic amount of a catalyst consisting of an antimony trihalide and a material selected from the group consisting of antimony carboxylates and antimony alcoholates wherein the percent of the antimony trihalide in the catalyst is from 10 to 90 percent by weight.

2. The process of claim 1 wherein the polyisocyanate is a polyarylpolyisocyanate having at least two interconnected aromatic rings substituted with at least one isocyanato group per aromatic ring.

3. The process of claim 1 wherein the antimony trihalide is antimony trichloride.

4. The process of claim 2 wherein the polyol is a carboxy-containing adduct polyol or mixture of adduct polyols prepared by reacting (a) at least one polyether polyol with (b) 5 to 50 percent by weight based on the total of (a) and (b) of an anhydride of a poly-functional carboxylic acid at a temperature of about 150° F. to 350° F.

5. In a process for producing a flame-resistant foam composition by the reaction of (1) a polyarylpolyisocyanate having at least two interconnected aromatic rings substituted with at least one isocyanato group per aromatic ring, (2) a polyfunctional aromatic carboxylic acid derivative comprising an aromatic nucleus substituted by carbonyl-based members selected from the group consisting of anhydride, carboxyl, and acyl halide, and (3) a polyol, the improvement comprising the carrying out of the foaming reaction in the presence of a catalytic amount of a catalyst consisting of an antimony trihalide and a material selected from the group consisting of antimony carboxylates and antimony alcoholates wherein the percent of the antimony trihalide in the catalyst is from 10 to 90 percent by weight.

6. The process of claim 5 wherein the polyol is a carboxy-containing adduct polyol or mixture of adduct polyols prepared by reacting (a) at least one polyether polyol with (b) 5 to 50 percent by weight based on the total of (a) and (b) of an anhydride of a poly-functional carboxylic acid at a temperature of about 150° F. to 350° F.

7. The process of claim 5 wherein the antimony trihalide is antimony trichloride.

8. The process of claim 5 wherein the antimony carboxylate is antimony triacetate.

9. The process of claim 5 wherein the antimony alcoholate is antimony tris n-butoxide.

10. The process of claim 5 wherein the percent of antimony trihalide in the catalyst is from 20 to 60 percent by weight.

11. In a process for producing urethane foams by the reaction of an organic polyisocyanate and a polyol, the improvement comprising the carrying out of the foaming reaction in the presence of a catalytic amount of a catalyst consisting of an antimony trihalide and antimony tallate wherein the percent of the antimony trihalide in the catalyst is from 10 to 90 percent by weight.

12. The process of claim 11 wherein the antimony trihalide is antimony trichloride.

13. The process of claim 11 wherein the polyisocyanate is a polyarylpolyisocyanate having at least two interconnected aromatic rings substituted with at least one isocyanato group per aromatic ring.

14. The process of claim 13 wherein the polyol is a carboxy-containing adduct polyol or mixture of adduct polyols prepared by reacting (a) at least one polyether polyol with (b) 5 to 50 percent by weight based on the total of (a) and (b) of an anhydride of a poly-functional carboxylic acid at a temperature of about 150° F. to 350° F.

15. The process of claim 14 wherein the antimony trihalide is antimony trichloride.

16. In a process for producing a flame-resistant foam composition by the reaction of (1) a polyarylpolyisocyanate having at least two interconnected aromatic rings substituted with at least one isocyanato group per aromatic ring, (2) a polyfunctional aromatic carboxylic acid derivative comprising an aromatic nucleus substituted by carbonyl-based members selected from the group consisting of anhydride, carboxyl, and acyl halide, and (3) a polyol, the improvement comprising the carrying out of the foaming reaction in the presence of a catalytic amount of a catalyst consisting of an antimony trihalide and antimony tallate wherein the percent of the antimony trihalide in the catalyst is from 10 to 90 percent by weight.

17. The process of claim 16 wherein the polyol is a carboxy-containing adduct polyol or mixture of adduct polyols prepared by reacting (a) at least one polyether polyol with (b) 5 to 50 percent by weight based on the total of (a) and (b) of an anhydride of a poly-functional carboxylic acid at a temperature of about 150° F. to 350° F.

18. The process of claim 16 wherein the antimony trihalide is antimony trichloride.

19. The process of claim 17 wherein the antimony trihalide is antimony trichloride.

20. The process of claim 16 wherein the percent of antimony trihalide in the catalyst is from 20 to 60 percent by weight.

References Cited

UNITED STATES PATENTS

| Number | Date | Name | Class |
|---|---|---|---|
| 3,288,830 | 11/1966 | Stallings | 260—2.5 AB |
| 3,407,153 | 10/1968 | Bowman | 260—2.5 AB |
| 3,705,128 | 12/1972 | Knowles | 260—2.5 AJ |
| 3,609,106 | 9/1971 | Papa | 260—2.5 AB |
| 3,476,933 | 11/1969 | Mendelsohn | 260—2.5 AB |
| 3,471,411 | 10/1969 | Bowman | 260—2.5 AB |
| 3,109,853 | 11/1963 | Worsley | 260—2.5 AB |
| 3,455,850 | 7/1969 | Saunders | 260—2.5 AJ |
| 3,259,593 | 7/1966 | Eichhorn | 260—2.5 AJ |
| 3,245,958 | 4/1966 | Hindersinn | 260—2.5 AB |
| 3,245,957 | 4/1966 | Hindersinn | 260—2.5 AB |
| 3,738,953 | 6/1973 | Anorga | 260—2.5 AM |
| 3,235,518 | 2/1966 | Hostettler | 260—2.5 AB |
| 3,162,609 | 12/1964 | Eichhorn | 260—2.5 AJ |
| 3,136,732 | 6/1964 | Kaestner | 260—2.5 AB |
| 3,119,792 | 1/1964 | Sehultheis | 260—2.5 AB |
| 3,081,327 | 3/1963 | Birum | 260—2.5 AJ |
| 3,075,928 | 1/1963 | Lanham | 260—2.5 AJ |
| 3,073,788 | 1/1963 | Hostettler | 260—2.5 AB |
| 3,061,557 | 10/1962 | Hostettler | 260—2.5 AB |

FOREIGN PATENTS

| Number | Date | Country | Class |
|---|---|---|---|
| 808,229 | 3/1969 | Canada | 260—2.5 AJ |
| 948,191 | 1/1964 | Great Britain | 260—2.5 AB |
| 876,434 | 8/1966 | Great Britain | 260—2.5 AB |
| 898,060 | 6/1962 | Great Britain | 260—77.5 AB |
| 1,012,653 | 1/1963 | Great Britain | 260—2.5 AJ |
| 44/19,277 | 8/1969 | Japan | 260—2.5 AJ |

DONALD E. CZAJA, Primary Examiner

C. W. IVY, Assistant Examiner

U.S. Cl. X.R.

260—2.5 AJ, 2.5 AM, 2.5 AN, 75 NB, 77.5 AB